US009478134B2

(12) United States Patent
Narayanan et al.

(10) Patent No.: US 9,478,134 B2
(45) Date of Patent: Oct. 25, 2016

(54) METHOD OF DETERMINING AN ATTRIBUTE OF A PARKING STRUCTURE

(71) Applicant: General Motors LLC, Detroit, MI (US)

(72) Inventors: Santhosh Kumar Narayanan, Troy, MI (US); Mukesh Gupta, Farmington, MI (US); Marco T. Carnevale, Windsor (CA)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/512,141

(22) Filed: Oct. 10, 2014

(65) Prior Publication Data

US 2016/0104378 A1   Apr. 14, 2016

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| G08G 1/14 | (2006.01) | |
| G07C 5/00 | (2006.01) | |
| G01C 21/26 | (2006.01) | |
| G08G 1/01 | (2006.01) | |

(52) U.S. Cl.
CPC .............. *G08G 1/143* (2013.01); *G01C 21/26* (2013.01); *G07C 5/008* (2013.01); *G08G 1/0112* (2013.01)

(58) Field of Classification Search
CPC  G01C 21/3476; G01C 21/165; G01C 15/04; G01C 21/28; G01C 21/3679; G01C 21/3423; G01C 21/20; G01C 21/34; G01C 21/206; G01C 21/30; G01C 21/26; G08G 1/005; G08G 1/14; G08G 1/143; G08G 1/146; G08G 1/205; G08G 1/0175; G08G 1/09; G08G 1/096838; G08G 1/144; G08G 1/017; G08G 1/07; G08G 1/149; G08G 1/20

USPC ............. 701/1, 301, 408, 400, 517, 36, 410, 701/423, 465, 519, 118, 23, 119, 409, 438, 701/439, 450, 522, 527

See application file for complete search history.

(56) References Cited

U.S. PATENT DOCUMENTS 5,910,782 A * 6/1999 Schmitt .................... G08G 1/14
340/539.1
6,501,391 B1 * 12/2002 Racunas, Jr. ...... G06Q 30/0284
235/378

(Continued)

*Primary Examiner* — Calvin Cheung
*Assistant Examiner* — Luis A Martinez Borrero
(74) *Attorney, Agent, or Firm* — Dierker & Kavanaugh, P.C.

(57) ABSTRACT

A method of determining an attribute of a parking structure includes monitoring vehicle status data (VSD) obtained by a first on-board processor operatively associated with a vehicle telematics unit. The first processor executes computer readable code encoded on a first non-transitory computer readable medium. The method includes recording, in a vehicle memory operatively associated with the first processor, the VSD based on an output of a vehicle on-board sensor. The method further includes communicating the recorded VSD to a data aggregator of a remote parking information system (RPIS) for storage as aggregated data in a computer memory associated with the RPIS. The method determines, via the data aggregator, whether the vehicle is in the parking structure based on the communicated recorded VSD. The method further includes determining the attribute via the RPIS based on the VSD stored in the computer memory, and storing the attribute in the computer memory.

15 Claims, 3 Drawing Sheets

(56) References Cited

U.S. PATENT DOCUMENTS

| | | | | |
|---|---|---|---|---|
| 6,694,259 B2* | 2/2004 | Curbow | G01C 21/26 | 340/468 |
| 7,026,954 B2* | 4/2006 | Slemmer | G08G 1/14 | 340/932.2 |
| 7,123,166 B1* | 10/2006 | Haynes | G08G 1/14 | 340/932.2 |
| 7,516,010 B1* | 4/2009 | Kaplan | G01C 21/30 | 340/932.2 |
| 7,538,690 B1* | 5/2009 | Kaplan | G01C 21/20 | 340/932.2 |
| 7,825,827 B2* | 11/2010 | Jang | G08G 1/017 | 340/932.2 |
| 7,834,778 B2 | 11/2010 | Browne et al. | | |
| 7,893,847 B2* | 2/2011 | Shanbhag | G08G 1/14 | 340/435 |
| 7,912,628 B2* | 3/2011 | Chapman | G01C 21/3691 | 701/117 |
| 8,063,797 B1* | 11/2011 | Sonnabend | G06K 9/00791 | 340/932.2 |
| 8,175,803 B2* | 5/2012 | Caraballo | G01C 21/3682 | 701/423 |
| 8,302,847 B2* | 11/2012 | Johnson | G08G 1/017 | 235/375 |
| 8,306,734 B2* | 11/2012 | Mathews | G01C 21/3685 | 701/408 |
| 8,325,063 B2* | 12/2012 | Dasgupta | G08G 1/14 | 340/932.2 |
| 8,423,276 B2* | 4/2013 | Judd | G01C 21/165 | 701/469 |
| 8,589,065 B2* | 11/2013 | Scofield | G01C 21/3605 | 340/932.2 |
| 8,665,118 B1* | 3/2014 | Woodard | G08G 1/144 | 340/425.5 |
| 8,754,784 B2* | 6/2014 | Ji | G08G 1/143 | 340/932.2 |
| 8,762,035 B2* | 6/2014 | Levine | G01C 21/3492 | 340/988 |
| 8,816,880 B1* | 8/2014 | Foster | G08G 1/146 | 340/932.2 |
| 8,843,307 B1* | 9/2014 | Kolodziej | G01C 21/3685 | 340/932.2 |
| 9,013,326 B2* | 4/2015 | Desiderio | G01S 7/003 | 340/425.5 |
| 9,064,417 B2* | 6/2015 | Smullin | G08G 1/142 | |
| 9,086,285 B2* | 7/2015 | Gupta | G01C 21/165 | |
| 9,087,453 B2* | 7/2015 | Krivacic | G06Q 10/02 | |
| 2002/0008614 A1* | 1/2002 | Yeh | G08G 1/005 | 340/425.5 |
| 2005/0280555 A1* | 12/2005 | Warner | G08G 1/14 | 340/932.2 |
| 2006/0033641 A1* | 2/2006 | Jaupitre | G08G 1/14 | 340/932.2 |
| 2006/0267799 A1* | 11/2006 | Mendelson | G08G 1/14 | 340/932.2 |
| 2007/0294952 A1* | 12/2007 | Li | E04H 6/285 | 52/30 |
| 2010/0007525 A1* | 1/2010 | Shanbhag | G08G 1/14 | 340/932.2 |
| 2010/0318290 A1* | 12/2010 | Kaplan | G01C 21/30 | 701/426 |
| 2011/0015934 A1* | 1/2011 | Rowe | G06Q 30/02 | 705/1.1 |
| 2011/0241898 A1* | 10/2011 | Busch | G08G 1/14 | 340/932.2 |
| 2012/0139757 A1* | 6/2012 | Ji | G08G 1/143 | 340/932.2 |
| 2013/0265174 A1* | 10/2013 | Scofield | G01C 21/34 | 340/932.2 |
| 2013/0268187 A1* | 10/2013 | Scofield | G01C 21/3685 | 701/400 |
| 2014/0085109 A1* | 3/2014 | Stefik | G06Q 10/02 | 340/932.2 |
| 2014/0132767 A1* | 5/2014 | Sonnabend | G08G 1/144 | 348/148 |
| 2014/0313058 A1* | 10/2014 | Chen | G08G 1/141 | 340/932.2 |
| 2015/0057926 A1* | 2/2015 | Gupta | G01C 21/165 | 701/500 |
| 2015/0123818 A1* | 5/2015 | Sellschopp | G01C 21/3484 | 340/932.2 |

\* cited by examiner

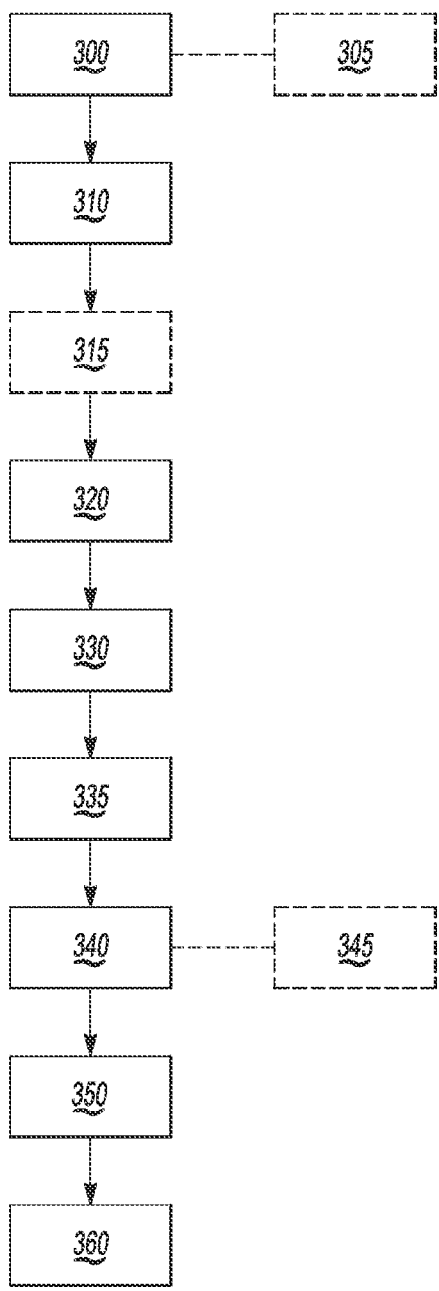
Fig-3
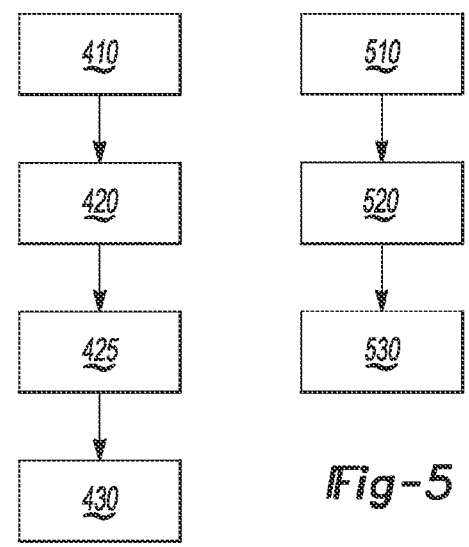
Fig-4
Fig-5
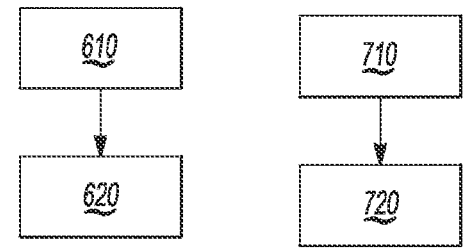
Fig-6
Fig-7

METHOD OF DETERMINING AN ATTRIBUTE OF A PARKING STRUCTURE

TECHNICAL FIELD

The present disclosure relates generally to methods and systems for determining an attribute of a parking structure.

BACKGROUND

Vehicle navigation systems, including navigation systems based on Global Positioning System (GPS) satellites, provide navigation information to vehicle operators and occupants. In some vehicles, communication systems and computers provide information relevant to various points-of-interest. For example, a navigation system can provide not only a route to a museum, but also the operating hours and the price of admission. Attributes of parking structures may be desirable to vehicle operators and passengers.

SUMMARY

A method of determining an attribute of a parking structure includes monitoring vehicle status data (VSD) obtained by a first on-board processor operatively associated with a vehicle telematics unit. The first processor executes computer readable code encoded on a first non-transitory computer readable medium. The method includes recording, in a vehicle memory operatively associated with the first processor, the VSD based on an output of a vehicle on-board sensor. The method further includes communicating the recorded VSD to a data aggregator of a remote parking information system (RPIS) for storage as aggregated data in a computer memory associated with the RPIS. The method determines, via the data aggregator, whether the vehicle is in the parking structure based on the communicated recorded VSD. The data aggregator, including a second processor, executes computer readable code encoded on a second non-transitory computer readable medium. The method still further includes determining the attribute via the RPIS based on the VSD stored in the computer memory, and storing the attribute in the computer memory.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a logic flow diagram depicting an example of a method of determining an attribute of a parking structure according to the present disclosure;

FIG. 4 is a logic flow diagram depicting a portion of an example of a method of determining an attribute of a parking structure according to the present disclosure;

FIG. 5 is a logic flow diagram depicting a portion of an example of a method of determining an attribute of a parking structure according to the present disclosure;

FIG. 6 is a logic flow diagram depicting a portion of an example of a method of determining an attribute of a parking structure according to the present disclosure; and FIG. 7 is a logic flow diagram depicting a portion of an example of a method of determining an attribute of a parking structure according to the present disclosure.

DETAILED DESCRIPTION

Some navigation systems (e.g., GPS-based vehicle navigation systems) apply data, for example road map data, along with information on the location of a vehicle and a destination to assist in navigation of the vehicle. The road map data in existing navigation systems may have been collected from aerial/satellite images or other sources from, for example, government agencies. It is also possible for certain vehicles to communicate information to remote systems for use in navigation. For example, some vehicles can communicate information about traffic conditions to a remote data collection service. The remote data collection service may transmit the traffic condition information to navigation systems in other vehicles to be used when providing recommended routes. A system exists for capturing photographs of roads and buildings from a vantage point on a vehicle and associating the photographs with locations on a map. For example, a mapping application is available on personal computers in which a user can access a photograph of a parking structure near an entertainment venue such as a ballpark. By inspecting and analyzing the photographs, a person may be capable of determining some attributes of the parking structure that were current when the image was captured. In some cases, attributes of parking structures may be provided by a service with proprietary access to data. For example, architectural drawings and sensors at entrances and exits may be used to provide relatively current parking structure attributes. Such information may be subject to licensing and associated fees.

The system and method of the present disclosure uses vehicle sensors to collect vehicle data. The vehicle data is used to determine information that is applied to provide attributes of the parking structure. In an example in which the system includes a plurality of vehicles, the parking structure attributes may be collected with relatively high resolution and updated relatively frequently. For example, the vehicle status data may show that a popular entrance that has normally been used by 100 vehicles per hour is currently not being used at all, while a relatively unpopular entrance has seen an increase over normal use. Such information may be used to conclude that the popular entrance is closed. The closure of the popular entrance is a parking structure attribute.

The system and method of the present disclosure uses vehicle status data from vehicle on-board sensors to automatically determine attributes of parking structures. The vehicle status data does not include data that is directly provided by the parking structure itself. For example, traffic counters associated with a parking structure, (e.g., pneumatic traffic counters) do not provide vehicle status data as used herein. The system and method of the present disclosure does not use images captured by a camera.

Figure 1:
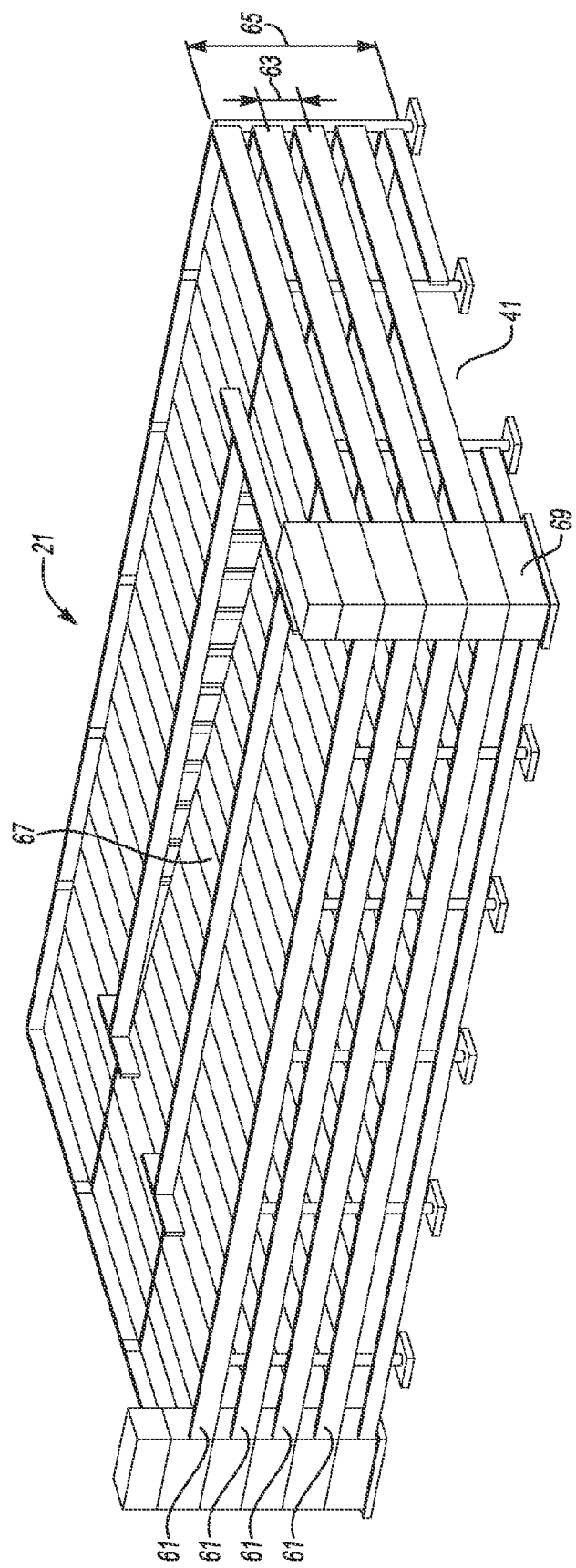
FIG. 1 is a semi-schematic perspective view of an example of a parking structure having attributes that are determinable by examples of the method of the present disclosure.

FIG. 1 is a semi-schematic perspective view of an example of a parking structure 21 having attributes that are determinable by examples of the method of the present disclosure. In examples of the present disclosure, the attribute of the parking structure 21 may include a quantity of parking levels 61 in the parking structure 21; a size and shape of the parking structure 21; a spacing 63 between the parking levels 61; a total height 65 of the parking structure 21; a ramp 67 position and direction within the parking structure 21; a quantity of parking spaces in the parking structure 21; a map of the parking spaces in the parking structure; a location of electric vehicle charging stations in the parking structure 21; locations of the parking spaces that have a highest rate of utilization; a location of a stairwell 69 or elevator; a location of a vehicle entrance 41, exit, or checkpoint; a distance to the parking structure 21 from a location; an average parking duration of a vehicle 12 in the parking structure 21; or combinations thereof.

As used herein, vehicle status data means data based on an on-board sensor 64 that describes a state of the vehicle 12. As used herein, the state of the vehicle may be any subset of the measurable parameters that describe the vehicle 12 at a particular time. For example, the vehicle 12 may have the transmission in "drive", and may be moving at a particular speed. A transmission gear selection sensor may provide vehicle status data related to the transmission gear selector being in "drive", and an on-board speed sensor may provide vehicle status data related to speed. As used herein, the sensors are on-board the vehicle. Vehicle status data is not limited to raw data from an on-board sensor; information based on the on-board sensor data may further include information from raw on-board sensor data that has been processed and combined with other data. An example of an on-board sensor is a GPS receiver. The GPS receiver receives satellite signals from the GPS constellation and outputs a position of the vehicle 12. For example, a GPS receiver may output vehicle status data associated with latitude, longitude and altitude. The position data (latitude, longitude and altitude) may be compared with map data to determine if the position is within a certain distance of a parking structure 21.

Examples of the system and method of the present disclosure monitor vehicle status data to determine attributes of a parking structure 21. By collecting and analyzing the vehicle status data, attributes of the parking structure 21 may be determined. By applying vehicle status data or information from a fleet of vehicles, the attribute of the parking structures may be determined relatively quickly.

As used herein, the term "user" refers to i) a vehicle owner, a vehicle driver, and/or a vehicle passenger and/or ii) a person or entity who/that participates in online networking. It is to be understood that the term "user" may be used interchangeably with the terms subscriber and/or service subscriber.

Additionally, the term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Figure 2:
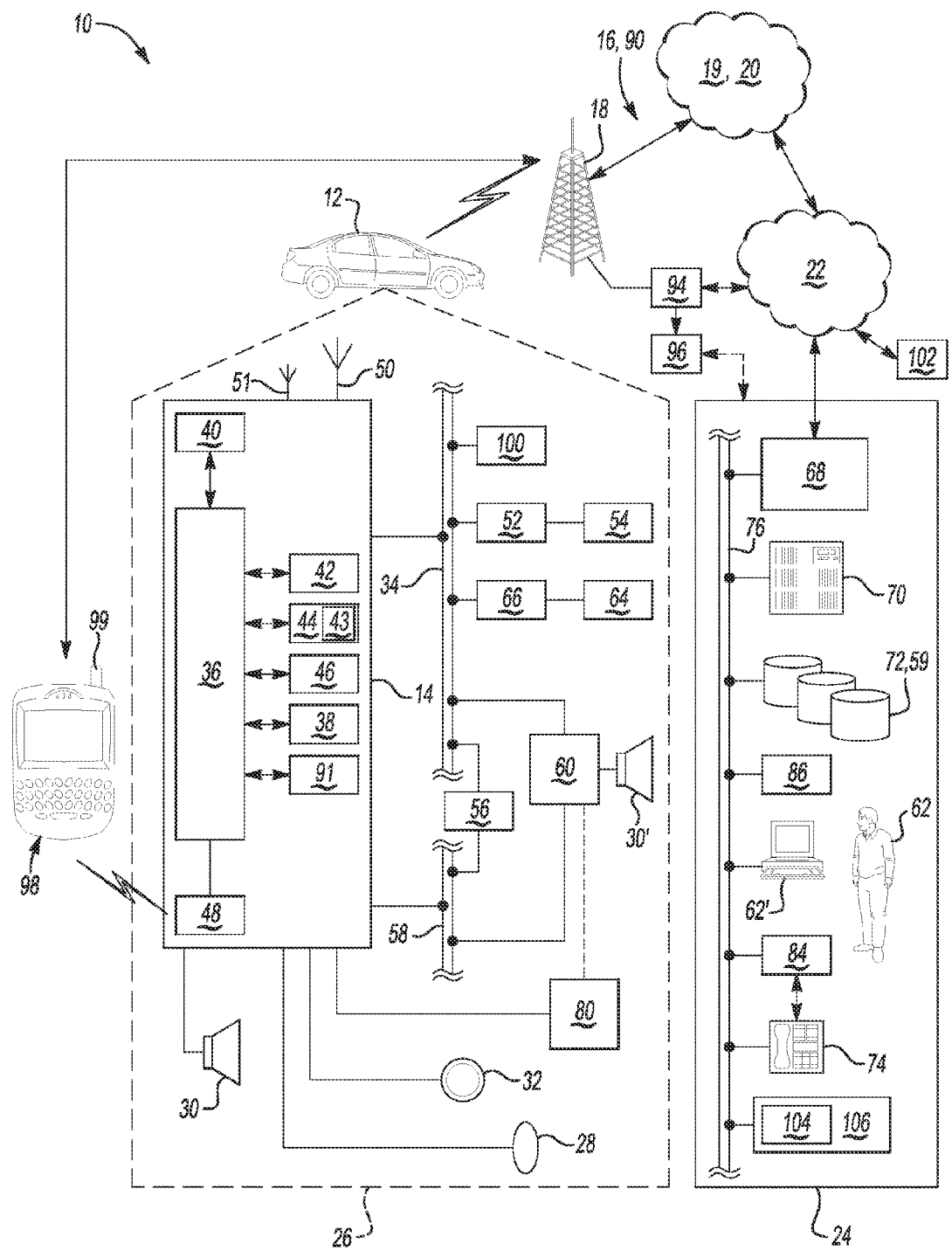
FIG. 2 is a schematic diagram depicting an example of a system for determining an attribute of a parking structure.

An example of a system 10 that may be used for determining the status of a vehicle 12, determining an attribute of a parking structure 21, and for communicating the status of the vehicle 12 and the parking structure 21 is schematically depicted in FIG. 2. This system 10 is described below as including a telematics service center 24 as a central back office for subscriber vehicles. It is to be understood, however, that the system 10 may include any facility, including those that do not necessarily provide telematics services. Some examples of facilities other than telematics service centers include traffic control centers, public safety facilities (e.g., police stations, fire stations, etc.), public health facilities (e.g., hospitals, etc.), private businesses, media facilities (e.g., radio networks, television networks, etc.), and/or the like.

The system 10 depicted in FIG. 2 generally includes a vehicle 12, a telematics unit 14 operatively disposed in the vehicle 12, a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, and one or more telematics service centers 24. In an example, the carrier/communication system 16 is a two-way radio frequency communication system, and may be configured with a web service supporting system-to-system communications (e.g., communications between the telematics service center 24 and the service provider 90).

For purposes of illustration, the system 10 will be described below using a car as the vehicle 12, and this vehicle 12 includes a number of vehicle systems that contribute to the overall operation of the vehicle 12. An example of such a system includes a vehicle ignition system (not shown), which may be used to power on the vehicle 12, for example, by turning an ignition key, pressing an ignition button inside the vehicle 12 or on a vehicle key fob, or the like. Another example of a vehicle system includes a transmission system 100 that is responsible for the mobility of the vehicle 12. The vehicle transmission system 100 utilizes a transmission shifting lever to switch between various operational modes of the vehicle 12, such as between a drive mode, a park mode, a reverse mode, etc. The transmission system 100 may be manual or automatic, and while in the drive mode, the transmission system 100 may be changed (either manually or automatically based on the type of transmission system) between various gears (e.g., first gear, second gear, third gear, etc.). In an example, the vehicle transmission system 100 may have associated therewith its own processor (not shown in FIG. 2), which sends signals to the telematics unit 14 using a data link when the operation mode of the vehicle transmission system 100 changes (e.g., drive mode, park mode, etc.) or when a gear of the transmission system 100 changes (e.g., from first gear to second gear, etc.). The transmission system processor may be operatively connected to the telematics unit 14 via a vehicle bus 34, which is described further hereinbelow.

The carrier/communication system 16 may be used to establish communication between a mobile communications device 98 and the telematics unit 14. The mobile communications device 98 may be owned or otherwise possessed by the user, and the mobile device 98 may be used by the user (e.g., when outside of the vehicle 12) to call the telematics unit 14 over the carrier/communication system 16. However, when the device 98 is located within close proximity (i.e., a distance suitable for short range wireless communication) of the telematics unit 14, communication between the mobile device 98 and the telematics unit 14 may be established via short range wireless connection (e.g., by pairing the telematics unit 14 and the mobile device 98 using a BLUETOOTH® connection or the like). In one example, the mobile device 98 is in close proximity of the telematics unit 14 when the mobile device 98 is inside a passenger compartment of the vehicle 12 (e.g., when the device 98 is on the person of the user, or stowed inside the passenger compartment while the vehicle 12 is moving).

In an example, the carrier/communication system 16 also includes a host server 94 including suitable computer equipment (not shown) upon which information of a remotely accessible page 96 resides/is stored. As disclosed herein, one of the websites may be a networking site with which the remotely accessible page 96 (e.g., a webpage) is associated, and another website may be a service site and/or account managing site associated with the telematics service center 24. In an example, the remotely accessible page 96 is a networking page set up and maintained by the user, for instance, and this webpage 96 is hosted by a social networking website. While, in this example, the webpage 96 is discussed as being a personal webpage of the user, it is to be understood that the webpage 96 may be run and owned by the entity operating the networking website and is stored on the host server 94. It is further to be understood that the webpage 96 may also be run and owned by the user who operates his/her own networking site, where this site is stored on a user-owned host server.

The following paragraphs provide a brief overview of one example of the system 10. It is to be understood, however, that additional components and/or other systems not shown here could employ the method(s) disclosed herein.

Vehicle 12 may be a mobile land vehicle (such as a motorcycle, car, truck, recreational vehicle (RV), or the like), a water vehicle (such as a boat) or an air vehicle (such as a plane, helicopter, or the like), and the vehicle 12 is equipped with suitable hardware and software that enables it to communicate (e.g., transmit and/or receive voice and data communications) over the carrier/communication system 16.

Some of the vehicle hardware 26 is generally shown in FIG. 2, including the telematics unit 14 and other components that are operatively connected to the telematics unit 14. Examples of the other components include a microphone 28, speakers 30, 30' and buttons, knobs, switches, keyboards, and/or controls 32. Generally, these other components enable a user to communicate with the telematics unit 14 and any other components of the system 10 in communication with the telematics unit 14. It is to be understood that the vehicle 12 may also include additional components suitable for use in, or in connection with, the telematics unit 14.

Operatively coupled to the telematics unit 14 is a network connection or vehicle bus 34, as mentioned above. Examples of suitable network connections include a controller area network (CAN), a media oriented system transfer (MOST), a local interconnection network (LIN), an Ethernet, and other appropriate connections, such as those that conform with known ISO (International Organization for Standardization), SAE (Society of Automotive Engineers), and IEEE (Institute of Electrical and Electronics Engineers) standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an on-board vehicle dedicated communications device. In an example, the telematics unit 14 is linked to the telematics service center 24 via the carrier/communication system 16, and is capable of calling and transmitting data to the telematics service center 24.

The telematics unit 14 provides a variety of services, both individually and through its communication with the telematics service center 24. The telematics unit 14 generally includes an electronic processing device 36 operatively coupled to one or more types of electronic vehicle memory 38, a cellular chipset/component 40, a wireless modem 42, a navigation unit containing a location detection (e.g., global positioning system (GPS)) chipset/component 43, a real-time clock (RTC) 46, a short-range wireless communication network 48 (e.g., a BLUETOOTH® unit), short-range wireless antenna 51, and/or a dual antenna 50. In one example, the wireless modem 42 includes a computer program and/or set of software routines executing within the processor 36.

It is to be understood that the telematics unit 14 may be implemented without one or more of the above listed components (e.g., the real-time clock (RTC) 46). In some examples of the method disclosed herein, the telematics unit 14 includes the short range wireless network 48. It is to be further understood that the telematics unit 14 may also include additional components and functionality as desired for a particular end use.

The processor 36 of the telematics unit 14 may be a micro controller, a controller, a microprocessor, a host processor, and/or a vehicle communications processor. In another example, processor 36 may be an application specific integrated circuit (ASIC). Alternatively, processor 36 may be a processor working in conjunction with a central processing unit (CPU). The processor 36 may, for example, include software programs having computer readable code to initiate and/or perform various functions of the telematics unit 14, as well as computer readable code for performing various steps of the examples of the methods disclosed herein. For instance, the processor 36 may include software programs that include computer readable code encoded on a first non-transitory computer readable medium 37 for determining vehicle status data. The processor 36, by executing the computer readable code, is to monitor vehicle status data associated with the vehicle 12. In examples of the present disclosure, the processor 36 is to record the vehicle status data in the vehicle memory 38. It is to be understood that the vehicle status data may be recorded in the vehicle memory 38 with a time stamp to associate the vehicle status data with a real time of occurrence. The processor 36 may receive the real time from the RTC 46.

The vehicle status data may be communicated to a remote parking information system. (i.e., a parking information system located apart from the vehicle 12), such as by transmitting vehicle status data to a data aggregator 104 at the telematics service center 24. This may be accomplished during a voice connection in the form of packet data over a packet-switch network (e.g., voice over Internet Protocol (VoIP), carrier/communication system 16, etc.).

In examples of the system for determining an attribute of the parking structure 21 of the present disclosure, the system 10 may include a vehicle data upload unit (VDU unit) 91 operatively associated with the telematics unit 14 to initiate a vehicle data upload event to communicate the vehicle status data to the telematics service center 24. In an example, the telematics unit 14 includes the VDU unit 91 or is interfaced to the VDU unit 91. As used herein, the VDU unit 91 is to receive data (e.g., vehicle status data) from the processor 36, packetize the data and place the data into a suitable format for uniform transmission to the data aggregator 104, and transmit the packetized data message to the data aggregator 104. In some cases, the data received from the processor 36 may already be packetized, and in such instances, the VDU unit 91 will revise the format for uniform transmission of the data to the data aggregator 104. Revising the format may include, for example, re-packetizing the data for transmission over the carrier/communication system 16 (which may require a different format than the format of the data received by the processor 36). In one example, the VDU unit 91 is operatively connected to the processor 36 of the telematics unit 14, and thus is in communication at least with the data aggregator 104 via the buses 34 and 76 and the carrier/communication system 16. In another example, the VDU unit 91 may be the telematics unit's central data system that can include its own modem, processor, and on-board database. The database can be implemented using a separate network attached storage (NAS) device or be located elsewhere, such as in the vehicle memory 38, as desired. The VDU unit 91 has an application program that handles the vehicle data upload processing, including communication with the data aggregator 104.

Still referring to FIG. 2, the location detection chipset/component 43 may include a Global Positioning System (GPS) receiver, a radio triangulation system, a dead reckoning position system, and/or combinations thereof. A GPS receiver provides accurate time and latitude, longitude, and altitude coordinates of the vehicle 12 responsive to a GPS broadcast signal received from a GPS satellite constellation (not shown). The GPS location chipset/component 43 may be associated with its own processor (not shown) that obtains vehicle heading signals, and transmits those signals to the telematics unit 14 via the bus 34. As used herein, a "heading signal" is a signal containing information related to the compass direction the vehicle 12 is then-currently traveling or moving toward. The heading signal may, e.g., be used along with other data in the algorithm to ultimately determine if the vehicle 12 is approaching a parking structure 21, and/or if the vehicle 12 is departing a parking structure.

The cellular chipset/component 40 may be an analog, digital, dual-mode, dual-band, multi-mode and/or multi-band cellular phone. The cellular chipset/component 40 uses one or more prescribed frequencies in the 800 MHz analog band or in the 800 MHz, 900 MHz, 1900 MHz and higher digital cellular bands. Any suitable protocol may be used, including digital transmission technologies, such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi. In other instances, the protocol is Evolution Data Optimized (EVDO) Rev B (3G) or Long Term Evolution (LTE) (4G).

Also associated with processor 36 is the previously mentioned RTC 46, which provides accurate date and time information to the telematics unit 14 hardware and software components that may require and/or request date and time information. In an example, the RTC 46 may provide date and time information periodically, such as, for example, every ten milliseconds.

The electronic vehicle memory 38 of the telematics unit 14 may be configured to store data associated with the various systems of the vehicle 12, vehicle operations, vehicle user preferences and/or personal information, and the like.

The telematics unit 14 provides numerous services alone or in conjunction with the telematics service center 24, some of which may not be listed herein, and is configured to fulfill one or more user or subscriber requests. Several examples of these services include, but are not limited to: turn-by-turn directions and other navigation-related services provided in conjunction with the GPS based location chipset/component 43; airbag deployment notification and other emergency or roadside assistance-related services provided in connection with various crash and or collision sensor interface modules 52 and crash sensors 54 located throughout the vehicle 12; and infotainment-related services where music, web pages, movies, television programs, videogames and/or other content is downloaded by an infotainment center 56 operatively connected to the telematics unit 14 via vehicle bus 34 and audio bus 58. In one example, downloaded content is stored (e.g., in vehicle memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the telematics service center 24, the telematics unit 14 is considered to be operating in a telematics service mode.

Vehicle communications generally utilize radio transmissions to establish a voice channel with carrier/communication system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 43 and the cellular chipset/component 40.

In an example of the present disclosure, an element of the vehicle status data may be based on the on-board sensor data to determine latitude, longitude, altitude, heading, and speed of the vehicle 12 during an interruption of radio-based input to a location detection chipset/component 43 of a navigation unit 44 in the telematics unit 14. The system of the present disclosure is to be operable to determine latitude, longitude, altitude, heading, and speed based on on-board sensors and a last known position. Such a dead reckoning capability may be useful in providing the vehicle status data to determine attributes of parking structures in e.g. structures with steel reinforcements that may interfere with radio communications. On-board sensors that contribute vehicle status data to dead reckoning may be, for example, gyroscopic sensors, inertial sensors, wheel speed sensors, output shaft speed sensors, steering angle sensors, and inclinometers, along with the RTC 46.

The microphone 28 provides the user with a means for inputting verbal or other auditory commands, and can be equipped with an embedded voice processing unit utilizing human-machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons, knobs, switches, keyboards, and/or controls 32 may be an electronic pushbutton used to initiate voice communication with the telematics service center 24 (whether it be a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58.

Still referring to FIG. 2, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other on-board vehicle sensors 64, connected to various sensor interface modules 66 are operatively connected to the vehicle bus 34. Example on-board vehicle sensors 64 include, but are not limited to, gyroscopes, accelerometers, speed sensors, magnetometers, emission detection and/or control sensors, environmental detection sensors, and/or the like. One or more of the on-board sensors 64 enumerated above may be used to obtain vehicle data for use by the telematics unit 14 or the telematics service center 24 (when transmitted thereto from the telematics unit 14) to determine the operation of the vehicle 12. Example sensor interface modules 66 include powertrain control, climate control, body control, and/or the like.

In an example, each of the vehicle on-board sensors 64 is associated with its own processor (not shown), which may include computer program(s) for obtaining information from the on-board sensors 64 and either utilizing them to perform various vehicle functions and/or to send the information (e.g., as signals) to another processor in the vehicle 12 (e.g., the processor 36) to be utilized in other computer program(s). For instance, the speed sensor may be associated with its own processor that obtains speed signals from the speed sensor and transmits those signals to the processor 36 of the telematics unit 14 via the vehicle bus 34. The processor 36 may utilize the speed signals in executing the method, and the speed signals include information pertaining to the instantaneous speed of the vehicle 12. The instantaneous (or then-current) vehicle speed may be used to trigger the vehicle status determination if the vehicle speed exceeds a threshold speed. The instantaneous vehicle speed may also be used during processing by the processor 36 to obtain other information such as an average vehicle speed, maximum speed, or the like, and this information may be used as input data to determine vehicle status data.

The vehicle hardware 26 includes the display 80, which may be operatively directly connected to or in communication with the telematics unit 14, or may be part of the audio component 60. The display 80 may be any HMI disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the carrier/communication system 16 with land network 22. It is to be understood that various cell tower/base station/MSC arrangements are possible and could be used with the wireless portion of the carrier/communication system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the carrier/communication system 16, it could be incorporated within an MSC 20 or some other network components as well.

Land network 22 may be a conventional land-based telecommunications network that is connected to one or more landline telephones and connects the wireless portion of the carrier/communication network 16 to the telematics service center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

The telematics service centers 24 of the telematics service provider (also referred to herein as call centers) are designed to provide the vehicle hardware 26 with a number of different system back-end functions. According to the example shown in FIG. 2, one call center 24 generally includes one or more switches 68, servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of telematics service center 24 functions. Further, the various operations of the telematics service center 24 are carried out by one or more computers (e.g., computer equipment 74) programmed to carry out some of the tasks of the telematics service center 24. The computer equipment 74 (including computers) may include a network of servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

Additionally, for purposes of the instant disclosure, the telematics service center 24 is in selective and operative communication with the telematics unit 14 and host server 94. In an example, the telematics service center 24 further includes the data aggregator 104 of a remote parking information system 106, as previously mentioned, which is embodied at the telematics service center 24 as a data aggregation module. The telematics service center 24 may be in selective and operative communication with the telematics unit 14 via the communication system 16. The data aggregator 104 may receive and bin the vehicle status data from telematics unit 14. The data aggregator 104 may otherwise be operatively connected to the communications module 86 at the telematics service center 24 (via, e.g., the bus 76), and is configured to receive and bin the vehicle status data upon receiving it from the communications module 86. In some instances, the data aggregator 104 may simply be a data repository. In other instances, the data aggregator 104 is also capable of running computer readable code/software routines for receiving and processing the vehicle status data or information based on the vehicle status data received from the telematics unit 14. The remote parking information system 106 determines an attribute of the parking structure based on the vehicle status data. The data aggregator 104 stores the attribute of the parking structure in a computer memory 39 associated with the data aggregator 104. In an example, the computer memory 39 may be a database 72 in operative communication with the remote parking information system 106. The telematics service center 24 may be operable to communicate the attribute of the parking structure to the telematics unit 14 or another telematics unit 14'.

Further, the database(s) 72 may be designed to store subscriber profile records, subscriber behavioral patterns, or any other pertinent subscriber information. In an example, the database(s) 72 may be configured to store a subscriber profile, which may contain personal information of subscriber (e.g., the subscriber's name, garage address, billing address, home phone number, cellular phone number, etc.), as well as subscriber selected preferences (e.g., how the data should be presented as a post on his/her personal webpage 96, etc.).

The communications module 86 is configured, via suitable communications equipment (such as equipment capable of handling messaging between the telematics service center 24 and the telematics unit 14 (e.g., VehComm), modems, TCP/IP supporting equipment, and/or the like), to enable the telematics service center 24 to establish a communication with the telematics unit 14, or vice versa. The communications module 86 is capable of receiving data messages (i.e., packet data) from the telematics unit 14, identify that the data pertains to the then-current status of the vehicle 12, and transmit the data messages to the data aggregator 104. The data aggregator 104 may run computer readable code/software routines that can receive the data, determine where to send the data to, and transmit such data to the proper location, or store such data for internal telematics service center 24 use. The telematics service center 24 may, for example, aggregate the data with vehicle status data obtained from other vehicles in the parking structure 21 to determine attributes of the parking structure 21.

It is to be appreciated that the telematics service center 24 may be any central or remote facility, manned or unmanned, mobile or fixed, to or from which it is desirable to exchange voice and data communications. As such, the live advisor 62 may be physically present at the telematics service center 24 or may be located remote from the telematics service center 24 while communicating therethrough.

The communications network provider 90 generally owns and/or operates the carrier/communication system 16. The communications network provider 90 includes a mobile network operator that monitors and maintains the operation of the communications network 16. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider telematics service center 24, the telematics service provider is a separate and distinct entity from the network provider 90. In an example, the equipment, employees, etc. of the communications network provider 90 are located remote from the telematics service center 24. The communications network provider 90 provides the user with telephone and/or Internet services, while the telematics service provider provides a variety of telematics-related services (such as, for example, those discussed hereinabove). The communications network provider 90 may interact with the telematics service center 24 to provide services (such as emergency services) to the user.

While not shown in FIG. 2, it is to be understood that in some instances, the telematics service provider operates a data center, which receives voice or data calls, analyzes the request associated with the voice or data call, and transfers the call to an application specific telematics service center associated with the telematics service provider. It is further to be understood that the application specific telematics service center may include all of the components of the data center, but is a dedicated facility for addressing specific requests, needs, etc. Examples of application specific telematics service centers include, but are not limited to, emergency services call centers, navigation route call centers, in-vehicle function call centers, or the like.

The telematics service center 24 components shown in FIG. 2 may also be virtualized and configured in a Cloud Computer, that is, Internet-based computing environment. For example, the computer equipment 74 may be accessed as a Cloud platform service, or PaaS (Platform as a Service), utilizing Cloud infrastructure rather than hosting computer equipment 74 at the telematics service center 24. The database 72 and server 70 may also be virtualized as a Cloud resource. The Cloud infrastructure, known as IaaS (Infrastructure as a Service), typically utilizes a platform virtualization environment as a service, which may include components such as the processor 84, database 72, server 70, and computer equipment 74. In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

FIG. 3 is a flow chart depicting an example of a method of the present disclosure for determining an attribute of the parking structure. The block at 300 represents the header of the flowchart indicating that the method is for determining an attribute of a parking structure 21. The block at 310 represents monitoring vehicle status data associated with a vehicle 12 obtained by a processor 36 on-board the vehicle 12 operatively associated with a telematics unit 14 disposed in the vehicle 12. The processor 36 executes computer readable code encoded on a first non-transitory computer readable medium 37.

Examples of the method of the present disclosure may include the step 315 of determining elements of the vehicle status data including latitude, longitude, altitude, heading, and speed during an interruption of radio-based input to a location detection chipset/component 43 of the navigation unit 44. For example, a dead reckoning position system may use information from on-board gyroscopic sensors, on-board speed sensors, on-board inclinometers, and a clock to determine the vehicle position based on sensed changes from a last known position established prior to the interruption of the radio-based input to the location detection chipset/component 43 of the navigation unit 44. Block 320 represents recording, in a vehicle memory 38 operatively associated with the processor 36, the vehicle status data based on an output of a vehicle on-board sensor 64.

Block 330 represents communicating the recorded vehicle status data to a data aggregator 104 of a remote parking information system 106 for storage in a computer memory 39 associated with the remote parking information system 106. The communicating the vehicle status data to the remote parking information 106 system may occur during a vehicle data upload event. Block 335 represents determining via the data aggregator 104 whether the vehicle 12 is in the parking structure 21 based on the communicated recorded vehicle status data. Block 340 represents determining the attribute of the parking structure via the remote parking information system 106 based on the vehicle status data stored in the computer memory 39. In an example of the present disclosure, determining an attribute of the parking structure 21 may include determining a location of a deck or ramp of a multi-level parking structure based on the vehicle status data including latitude, longitude, and altitude data as represented by Block 345. To be clear, the latitude, longitude, and altitude are determined from vehicle location. By keeping track of the vehicle's position over time, it is possible to map at least a portion of the multi-level parking structure. A map of the multi-level parking structure is a collection of attributes of the parking structure.

Block 350 represents storing the attribute of the parking structure 21 in the computer memory 39 associated with the remote parking information system 106. The remote parking information system 106 may store attributes of parking structures based on vehicle status data from a plurality of vehicles, or from a plurality of visits to the same parking structure 21 by a single vehicle 12.

As disclosed herein, the method of the present disclosure may further include the step 360 of communicating the attribute of the parking structure 21 from the remote parking information system 106 to the telematics unit 14 in the vehicle 12 or another telematics unit 14 in another vehicle 12. The attribute of the parking structures may also or alternatively be communicated to any system that may have a use for such attribute of the parking structures. It is to be understood that the method of the present disclosure may be applied to a large fleet of vehicles and the remote parking information system 106 may contain attribute of the parking structures 21 for a large quantity of parking structures 21. For example, every parking structure 21 in a state or country could potentially be included in the remote parking information system 106.

Block 305 is depicted in dashed lines to indicate that Block 305 applies to some examples of method disclosed herein; however, there may be examples of the method in which Block 305 does not apply. Block 305 represents that in examples of the method, the attribute of the parking structure 21 may include a quantity of parking levels 61 in the parking structure 21; a size and shape of the parking structure 21; a spacing 63 between the parking levels 61; a total height 65 of the parking structure 21; a ramp 67 position and direction within the parking structure 21; a quantity of parking spaces in the parking structure 21; a map of the parking spaces in the parking structure 21; a location of electric vehicle charging stations in the parking structure 21; locations of the parking spaces that have a highest rate of utilization; a location of a stairwell 69 or elevator; a location of a vehicle entrance 41, exit, or checkpoint; a distance to the parking structure from a location; an average parking duration of a vehicle in the parking structure; or combinations thereof.

The remote parking information system 106 uses the vehicle status data to determine attributes of the parking structure 21. The remote parking information system 106 may determine attributes of the parking structures associated with particular services in the parking structure 21. For example, if the vehicle status data indicates that the vehicle 12 is an electric vehicle, and the vehicle 12 is connected to a charging station at a particular location in the parking structure 21. The location of an Electric Vehicle charging station may be a parking structure attribute determined by the remote parking information system 106 and recorded for future communication. Similarly, the locations of core heater plug-in locations may be determined. If the vehicle status data includes information that the vehicle is a taxi, the location of a taxi stand may be determined.

FIG. 4 is a flow chart depicting steps in an example of the method of determining an attribute of the parking structure 21 in which the attribute of the parking structure 21 is the location of an electric vehicle charging station in the parking structure 21. In this example, determining, via the data aggregator 104, that the vehicle 12 is an electric vehicle based on the vehicle status data stored in the computer memory 39 is represented by block 410. Determining, via the data aggregator 104, that the vehicle 12 is connected to a charging station based on the vehicle status data stored in the computer memory 39 is depicted at block 420. Block 425 represents determining, via the data aggregator 104, the vehicle 12 location at a time when the vehicle 12 is connected to the charging station. Block 430 represents inferring, via the data aggregator 104, a location of the electric vehicle charging station in the parking structure 21 based on the determining that the vehicle 12 is an electric vehicle, the determining that the vehicle 12 is connected to a charging station, and the determining the vehicle location at the time when the vehicle 12 is connected to the charging station.

In an example of the present disclosure in which the attribute of the parking structure is a quantity of parking levels in the parking structure 21, the attribute of the parking structure 21 may be determined as follows: using the data aggregator 104, the remote parking information system 106 may determine that vehicles are parked (e.g. ignition off, gear selector in park, zero speed for at least a minimum amount of time) at different altitudes. By grouping the altitudes of various instances of parked vehicles, the altitudes may tend to be in groups of similar altitudes. The quantity of parking levels may be inferred from the number of groups. The quantity of parking levels may also be inferred from a maximum and minimum altitude attained by vehicles in a particular structure and dividing by a building standard for spacing between levels. For example, a standard floor-to-floor spacing may be about 10 feet. To illustrate: if vehicles parked in the parking structure had been recorded at 45 feet above ground level and −15 feet below ground level, the remote parking information system may infer that there are [45−(−15)]/10=6 levels. As more information is accumulated by the data aggregator 104, the number of levels may be verified by grouping the altitudes of parked vehicles as described above.

FIG. 5 is a flow chart depicting steps in an example of the method of determining an attribute of the parking structure 21 in which the attribute of the parking structure 21 is a quantity of parking levels in the parking structure 21. The block at 510 represents determining, via the data aggregator 104, the parking altitudes of a plurality of instances of vehicles 12 having a parked status in the parking structure 21 based on the vehicle status data stored in the computer memory 39. Block 520 represents grouping into parking levels, via the data aggregator 104, parking altitudes that are within a predetermined altitude tolerance. Block 530 represents determining, via the data aggregator 104, a quantity of the parking levels based on the grouping into parking levels wherein the attribute of the parking structure 21 is the quantity of the parking levels.

In an example of the present disclosure in which the attribute of the parking structure is a size and shape of the parking structure, the attribute of the parking structure may be determined as follows: Using the data aggregator 104, the remote parking information system 106 may determine that vehicles have been located (while moving or parked) throughout a volume of space. The remote parking information system 106 may infer that the parking structure is approximately shaped having an outline that surrounds the volume of space that is occupiable by the vehicles that have entered the parking structure.

FIG. 6 is a flow chart depicting steps in an example of the method of determining an attribute of the parking structure 21 in which the attribute of the parking structure 21 is an outline map of the parking structure 21. Block 610 represents determining, via the data aggregator 104, an envelope of locations including all locations of vehicles 12 in a parking structure 21 over a predetermined period of time based on the vehicle status data stored in the computer memory 39. Block 620 represents inferring an outline map of the parking structure based on the envelope wherein the attribute of the parking structure 21 is the outline map of the parking structure 21.

The remote parking information system 106 may similarly determine a spacing 63 between the parking levels 61, a total height 65 of the parking structure 21, a ramp 67 position and direction within the parking structure 21, a quantity of parking spaces in the parking structure 21, and a map of the parking spaces in the parking structure 21 from the location data of vehicles that have entered the parking structure 21.

The remote parking information system 106 may determine an attribute of the parking structures based on a frequency of occurrence of a particular data element. For example, the popularity of particular parking spots may be determined from vehicle status data examined over a period of time. Such information, combined with behavioral heuristics may be used to infer a location of a stairwell, elevator, or pedestrian exit. For example, if a behavioral heuristic is based on the notion that people tend to park vehicles near stairwells 69, elevators, and exits, and the stored data indicates that the spaces near the corners are most popular in a parking structure 21, it may be inferred that stairwells 69 or elevators are located at the corners of the structure. As such, it is not necessary for the vehicle status data to be a literal measurement of every attribute of the parking structure 21. The location of a stairwell 69 may be inferred without the vehicle 12 actually driving on the stairs.

FIG. 7 is a flow chart depicting steps in an example of the method of determining an attribute of the parking structure 21 in which the attribute of the parking structure 21 is a location of a stairwell of the parking structure 21. Block 710 represents determining, via the data aggregator 104, a popularity of parking spots in the parking structure 21 over a predetermined period of time based on the vehicle status data stored in the computer memory 39. Block 720 represents inferring, via the data aggregator 104, a location of a stairwell of the parking structure 21 based on applying behavioral heuristics to the popularity of the parking spots wherein the attribute of the parking structure is the location of the stairwell of the parking structure 21.

The remote parking information system 106 may determine attributes of the parking structure 21 based on a duration of occurrence of a particular data element. For example, an average parking duration may be determined. A quantity of parking spaces available at a particular time may be estimated. It is not necessary for every vehicle parked in the parking structure to be capable of interacting with the system 10 of the present disclosure. For example, if historical data shows that vehicles normally stop entering a football stadium parking structure within 23 minutes before the scheduled start of a football game, the remote parking information system 106 of the present disclosure may determine that an attribute of the football stadium parking structure is that the structure is usually full 23 minutes prior to a football game. It is not necessary for every vehicle in the football stadium parking structure at a particular time to be capable of interacting as disclosed herein. The useful information that the parking structure is likely to be full may be provided by the remote parking information system 106 based on an absence of data or data that varies from a norm.

While several examples have been described in detail, it will be apparent to those skilled in the art that the disclosed examples may be modified. Therefore, the foregoing description is to be considered non-limiting.

The invention claimed is:

1. A method of determining an attribute of a parking structure, comprising:
   monitoring vehicle status data associated with a vehicle obtained by a first processor on-board the vehicle operatively associated with a telematics unit disposed in the vehicle, the first processor executing computer readable code encoded on a first non-transitory computer readable medium;

recording, in a vehicle memory operatively associated with the first processor, the vehicle status data based on an output of a vehicle on-board sensor;

determining elements of the vehicle status data including latitude, longitude, altitude, heading, and speed based on the on-board sensor output during an interruption of radio-based input to a location detection component of a navigation unit in the telematics unit;

communicating the recorded vehicle status data to a data aggregator of a remote parking information system for storage as aggregated data in a computer memory associated with the remote parking information system;

determining, via the data aggregator, whether the vehicle is in the parking structure based on the communicated recorded vehicle status data, the data aggregator, including a second processor, executing computer readable code encoded on a second non-transitory computer readable medium;

determining the attribute of the parking structure via the remote parking information system based on the vehicle status data stored in the computer memory; and storing the attribute of the parking structure in the computer memory.

2. The method as defined in claim 1 wherein the communicating the vehicle status data to the remote parking information system occurs during a vehicle data upload event.

3. The method as defined in claim 1, further comprising communicating the attribute of the parking structure from the remote parking information system to the telematics unit in the vehicle or an other telematics unit in an other vehicle.

4. The method as defined in claim 1 wherein the attribute of the parking structure includes a quantity of parking levels in the parking structure; a size and shape of the parking structure; a spacing between the parking levels; a total height of the parking structure; a ramp position and direction within the parking structure; a location of a stairwell or elevator; a location of a vehicle entrance, exit, or checkpoint; an average parking duration of a vehicle in the parking structure; a closure status of a popular entrance of the parking structure; or combinations thereof.

5. The method as defined in claim 1 wherein determining the attribute of the parking structure includes determining a location of a deck or ramp of a multi-level parking structure based on the vehicle status data including latitude, longitude, and altitude data.

6. The method as defined in claim 1, further comprising:
determining, via the data aggregator, that the vehicle is an electric vehicle based on the vehicle status data stored in the computer memory;
determining, via the data aggregator, that the vehicle is connected to a charging station based on the vehicle status data stored in the computer memory;
determining, via the data aggregator, the vehicle location at a time when the vehicle is connected to the charging station; and
inferring, via the data aggregator, a location of the electric vehicle charging station in the parking structure based on the determining that the vehicle is an electric vehicle, the determining that the vehicle is connected to a charging station, and the determining the vehicle location at the time when the vehicle is connected to the charging station wherein the attribute of the parking structure is the location of the electric vehicle charging station in the parking structure.

7. The method as defined in claim 1, further comprising:
determining, via the data aggregator, parking altitudes of a plurality of instances of vehicles having a parked status in the parking structure based on the vehicle status data stored in the computer memory;
grouping into parking levels, via the data aggregator, parking altitudes that are within a predetermined altitude tolerance; and
determining, via the data aggregator, a quantity of the parking levels based on the grouping into parking levels wherein the attribute of the parking structure is the quantity of the parking levels.

8. The method as defined in claim 1, further comprising:
determining, via the data aggregator, an envelope of locations including all locations of vehicles in a parking structure over a predetermined period of time based on the vehicle status data stored in the computer memory; and
inferring an outline map of the parking structure based on the envelope wherein the attribute of the parking structure is the outline map of the parking structure.

9. The method as defined in claim 1, further comprising:
determining, via the data aggregator, a popularity of parking spots in the parking structure over a predetermined period of time based on the vehicle status data stored in the computer memory; and
inferring, via the data aggregator, a location of a stairwell of the parking structure based on applying behavioral heuristics to the popularity of the parking spots wherein the attribute of the parking structure is the location of the stairwell of the parking structure.

10. A system for determining an attribute of a parking structure, comprising:
a telematics unit operatively disposed in a vehicle, the telematics unit including a first processor executing computer readable code encoded on a first non-transitory computer readable medium of the first processor for determining vehicle status data from on-board sensors;
the on-board sensors to determine elements of the vehicle status data including latitude, longitude, altitude, heading, and speed during an interruption of radio-based input to a location detection component of a navigation unit in the telematics unit;
a vehicle memory operatively associated with the first processor on the vehicle to store the vehicle status data;
the first processor, by executing the computer readable code, to:
monitor vehicle status data associated with the vehicle; and
record the vehicle status data in the vehicle memory; and
a telematics service center in selective communication with the telematics unit, the telematics service center including a data aggregator of a remote parking information system the data aggregator having a second processor for processing the vehicle status data or information based on the vehicle status data received from the telematics unit wherein the remote parking information system determines the attribute of the parking structure based on the vehicle status data or on information responsive to the recorded vehicle status data and wherein the data aggregator stores the attribute of the parking structure in a computer memory associated with the data aggregator.

11. The system as defined in claim 10, further comprising a vehicle data upload unit operatively associated with the telematics unit to initiate a vehicle data upload event to communicate the vehicle status data to the telematics service center.

12. The system as defined in claim 10 wherein the telematics service center communicates the attribute of the parking structure to the telematics unit or an other telematics unit.

13. The system as defined in claim 10 wherein the attribute of the parking structure includes a quantity of parking levels in the parking structure, a size and shape of the parking structure; a spacing between the parking levels; a total height of the parking structure; a ramp position and direction within the parking structure; a location of a stairwell or elevator; a location of a vehicle entrance, exit, or checkpoint; an average parking duration of a vehicle in the parking structure; or combinations thereof.

14. The system as defined in claim 10 wherein if the parking structure is a multi-level parking structure, the attribute of the parking structure includes a location of a deck or ramp based on the vehicle status data including latitude, longitude, and altitude data.

15. The method as defined in claim 1, further comprising:
  determining, via the data aggregator, a vehicles per hour norm for entrances of a parking structure; and
  determining that the parking structure is full based on an absence of vehicle per hour data, or vehicle per hour data that varies from the norm.

* * * * *